United States Patent [19]

Tanaka et al.

[11] 4,403,832
[45] Sep. 13, 1983

[54] LIQUID CRYSTAL DISPLAY DEVICE

[75] Inventors: Masashi Tanaka, Koganei; Yutaka Nakajima, Mitaka; Takahiko Ihochi, Koganei; Yoshimichi Shibuya, Mobara, all of Japan

[73] Assignee: Hitachi, Ltd., Tokyo, Japan

[21] Appl. No.: 199,978

[22] Filed: Oct. 23, 1980

[30] Foreign Application Priority Data

Oct. 24, 1979 [JP] Japan .................. 54-136406

[51] Int. Cl.³ .............................. G02F 1/13
[52] U.S. Cl. .................... 350/335; 350/337; 350/339 F
[58] Field of Search .......... 350/335, 337, 334, 331 R, 350/339 F, 349

[56] References Cited

U.S. PATENT DOCUMENTS

| | | |
|---|---|---|
| 3,622,224 | 11/1971 | Wysocki et al. |
| 3,712,047 | 1/1973 | Girard. |
| 3,865,469 | 2/1975 | Asai et al. .................. 350/349 |
| 3,944,331 | 3/1976 | Janning .................. 350/335 X |
| 4,241,339 | 12/1980 | Ushiyama .................. 350/349 X |

FOREIGN PATENT DOCUMENTS

| | | |
|---|---|---|
| 2356240 | 3/1974 | Fed. Rep. of Germany. |
| 2829602 | 2/1979 | Fed. Rep. of Germany. |
| 1401928 | 8/1975 | United Kingdom. |
| 1470475 | 4/1977 | United Kingdom. |
| 1501212 | 2/1978 | United Kingdom. |
| 1562391 | 3/1980 | United Kingdom. |

Primary Examiner—John K. Corbin
Assistant Examiner—Richard Gallivan
Attorney, Agent, or Firm—Antonelli, Terry & Wands

[57] ABSTRACT

A liquid crystal display device having a structural arrangement that a plurality of liquid crystal layers each for displaying a pattern are piled up and a pair of polarizers are provided above an uppermost liquid crystal layer and below a lowermost liquid crystal layer, is disclosed in which a polarizer is interposed between adjacent liquid crystal layers in such a manner that adjacent ones of the polarizers are different in direction of transmission axis from each other, in order to eliminate a white on black portion caused by an overlap of the patterns and to thereby reduce the area of a display region; or in which a white on black portion caused by an overlap of the patterns is used as a display portion to form a display pattern having a predetermined shape and to open up new possibilities for color display.

8 Claims, 16 Drawing Figures

LIQUID CRYSTAL DISPLAY DEVICE

BACKGROUND OF THE INVENTION

The present invention relates to a liquid crystal display device, and particularly to a liquid crystal display device which includes a plurality of liquid crystal layers lying in piles, and in which special attention is paid to the generation of a white on black pattern based upon an overlap of patterns formed respectively in the liquid crystal layers, that is, the generation of the above-mentioned white pattern is prevented or positively utilized.

According to one aspect of the present invention, a liquid crystal display device is proposed in which the generation of white on black patterns is prevented.

In an electronic device having a display part such as a wrist watch, a small-sized clock, or an electronic desk calculator, a liquid crystal display device has been widely used as the above display part in recent years. Further, there has been developed a watch or clock in which, as shown in FIG. 1 of the accompanying drawings, a display part 1 is divided into an analog display region 5 having short, long and second hands 2, 3 and 4 and a digital display region 6 for indiating the time by numerals. The display part 1 may be fabricated in such a manner that the analog and digital display regions 5 and 6 are formed of liquid crystal layers 7 and 8 respectively, as shown in FIG. 2. In more detail, the upper and lower liquid crystal layers 7 and 8 include therein analog and digital display patterns respectively. Further, upper and lower polarizers 9 and 10 are arranged above and below the liquid crystal layers 7 and 8 respectively, and a reflecting plate 11 is arranged below the lower polarizer 10. The polarizers 9 and 10 are equal in direction of transmission axis to each other.

In such a two-layer structure, when a portion (or a segment) of the upper liquid crystal layer 7 and a portion (or a segment) of the lower liquid crystal layer 8 overlap each other and moreover are simultaneously applied with a voltage, an overlapping portion of the segments forms a white on black pattern on a display surface. For this reason, the display part 1 is so designed that respective patterns in the liquid crystal layers 7 and 8 are prevented from overlapping each other. That is, the display part 1 is obliged to become large, and therefore it is impossible to provide a small-sized electronic device.

Now, explanation will be made in detail on the phenomenon that, in a case where respective segments of upper and lower liquid crystal layers overlap each other and are simultaneously applied with a voltage, an overlapping portion of the segments forms a white on black portion on a display surface and cannot be observed visually, by reference to FIGS. 3a and 3b. FIG. 3a is an exploded, explanatory view for showing a display part including liquid crystal layers and polarizers. Referring to FIG. 3a, an upper polarizer 12, a glass plate 13, an upper liquid crystal layer 14, a glass plate 15, a glass plate 16, a lower liquid crystal layer 17, a glass plate 18 and a lower polarizer 19 are arranged in the order described in the direction from top to bottom. In FIG. 3a, reference characters a, b, c and d designate points where light passes through the display part. In more detail, light passes through the upper polarizer 12, the upper liquid crystal layer 14, the lower liquid crystal layer 17 and the lower polarizer 19 at the points a, b, c and d respectively. Further, reference numerals ①, ② and ③ designate paths of light travelling in a direction from top to bottom, and ①', ②' and ③' those of light travelling in a direction from bottom to top (usually, the paths of light reflected back from a reflecting plate). Referring to FIG. 3a, on the paths ① and ①', there is provided no electrode for the liquid crystal layers 14 and 17. On the paths ② and ②', there are provided a pair of electrodes 20 which are formed on the glass plates 13 and 15 for sealing up the upper liquid crystal layer 14 therebetween. On the paths ③ and ③', there are provided upper electrodes 20 for the upper liquid crystal layer 14 and lower electrodes 20 for the lower liquid crystal layer 17. That is, the upper electrodes 20 and the lower electrodes 20 overlap each other.

FIG. 3b shows the polarization direction of light at a time immediately after light has passed through the members 12, 14, 17 and 19. In FIG. 3b, reference symbols ⟷ and ⊙ designate polarization directions of polarized light, and ⊗ shows that light has been absorbed and therefore a pattern becomes black on a display surface. The polarization direction of light is not changed when the light passes through that portion (or segment) of a liquid crystal layer which is applied with a voltage, but is changed by an angle of 90° when the light passes through a segment which is not applied with any voltage. Accordingly, in a case where light travels along the paths ① and ①', on which the upper and lower liquid crystal layers 14 and 17 are not applied with any voltage, light passes through the upper polarizer 12, the liquid crystal layers 14 and 17 and the lower polarizer 19, and therefore no pattern appears on the display surface. In a case where light travels along the paths ② and ②', on which only the upper liquid crystal layer 14 is applied with a voltage, the light travelling in the direction of the path ② cannot pass through the lower polarizer 19 and therefore a black pattern is formed on the display surface, and the light travelling in the direction of the path ②' cannot pass through the upper polarizer 12 and therefore a black pattern appears on the display surface.

In a case where light travels along the paths ③ and ③', on which each of the upper and lower liquid crystal layers 14 and 17 is provided with a pair of electrodes 20, and where a voltage is applied across the layer 14 and across the layer 17 simultaneously, light passes through the members 12, 13, 14, 15, 16, 17, 18 and 19 and therefore forms a light region on the display surface. In other words, an overlapping portion of the electrode pair 20 for the layer 14 and that for the layer 17 forms a white on black region on the display surface when these electrode pairs are simultaneously applied with a voltage.

Accordingly, an object of the present invention is to provide a liquid crystal display device in which a plurality of liquid crystal layers are piled up to display several kinds of patterns on a display surface, and in which the generation of a white on black region based upon an overlap of the patterns is prevented to reduce the area of the display surface.

In order to attain the above object, according to an aspect of the present invention, there is provided a liquid crystal display device including a plurality of liquid crystal layers lying in piles, wherein polarizers are arranged between adjacent liquid crystal layers, above an uppermost liquid crystal layer, and below a lowermost liquid crystal layer, and adjacent polarizers are different in direction of transmission axis from each other.

Further, according to an application of the present invention, there is proposed a liquid crystal display device in which a white on black portion caused by an overlap of segments in liquid crystal layers is positively utilized as a display pattern.

In ordinary liquid crystal display devices, when a voltage is applied across a liquid crystal layer through electrodes for forming a predetermined pattern, the light having passed through that portion of the liquid crystal layer which is applied with the voltage and corresponds to the predetermined pattern, is different in polarization direction from the light incident upon the portion and therefore cannot pass through a polarizer. That is, the light having passed through the portion of the liquid crystal layer corresponding to the predetermined pattern forms a black pattern on a display surface. According to the above-mentioned method, it is difficult to obtain a colored display pattern, a display surface is not colorful nor fashionable, and moreover the design of display is subjected to a restriction. For example, in a case where a wrist watch 101 shown in FIG. 7 has a front face 103 which is black painted, it is required to provide a white window (or portion) 104 in a central part of the face 103 since numerals 102 for indicating the hour and the minute are displayed in black. Accordingly, restrictions are placed to the color and design of the wrist watch.

In order to solve the above difficulties, it has been proposed to color other portions of the front face 103 than a display pattern in order to make the wrist watch colorful. According to such a proposal, however, the colored portions are observed more clearly than the display pattern, which makes it difficult to read the display pattern. Thus, the wrist watch becomes inferior in display characteristic. In a case where the front face is colored in a quiet tint taking the above difficulties into consideration, the wrist watch becomes unfashionable.

In order to solve such problems, a display device (or a watch) is disclosed in a Japanese Patent Application which is now laid open under the number of 79663/79. In the above display device, a plurality of liquid crystal layers each containing one of various dichroic dyes for forming different colors are piled up to independently display respective patterns. That is, a pattern colored in a tint is formed by a liquid crystal layer, another pattern colored in another tint is formed by another liquid crystal layer, and so on. Thus, at least two kinds of colored patterns can be displayed. In such a structure, however, it is required to employ a plurality of expensive liquid crystal materials assuming different colors, and therefore the display device becomes expensive. Moreover, when patterns colored in different tints overlap each other, an overlapping portion is changed in color through the substractive mixture of color, and there arise problems in designing such as the unbalance of color.

Accordingly, as one application of the present invention a liquid crystal device is considered which employs a structural arrangement of conventional liquid crystal display devices to display a pattern by a white on black portion or by a colored portion corresponding to the white on black portion, and which is therefore inexpensive and fashionable.

Further, this application of the present invention is intended to provide electronic devices such as an electronic watch and an electronic desk calculator in which the above-mentioned liquid crystal display device is incorporated.

In this application of the present invention, there is provided a liquid crystal display device in which a plurality of liquid crystal layers each for forming a pattern are piled up, a pair of polarizers are arranged above and below the liquid crystal layers, and the patterns formed by the liquid crystal layers are arranged in such a manner that an overlapping portion of the patterns forms a desired display pattern. Further, in the above-mentioned liquid crystal display device, the light passing through the liquid crystal layers in the direction from bottom to top, namely, the light from a reflecting plate (or a light source) which is placed below the liquid crystal layers, is made to be a colored light to form the desired display pattern of a color. Furthermore, in the same liquid crystal display device, at least one of the liquid crystal layers contains therein a dichroic dye for forming a color to form the desired display pattern of the color.

Other objects, features and advantages of the present invention will become apparent from the following description taken in conjunction with the accompanying drawings, in which:

BRIEF DESCRIPTION OF THE DRAWING FIGURES

DETAILED DESCRIPTION OF THE PREFERRED EMBODIMENTS

Figure 4A:
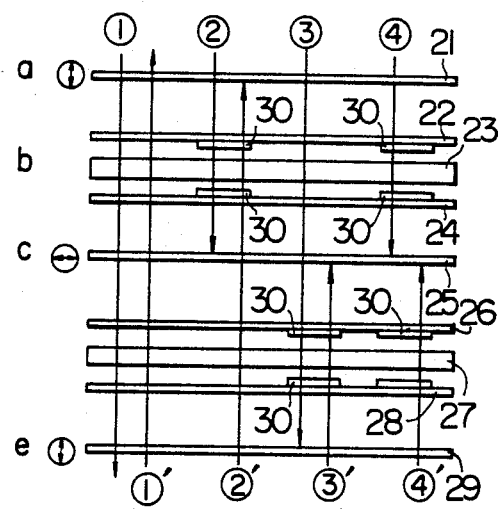
FIG. 4a is an exploded, explanatory view for showing that a light beam passes through various regions of an embodiment of a liquid crystal device according to the present invention.
Figure 4B:
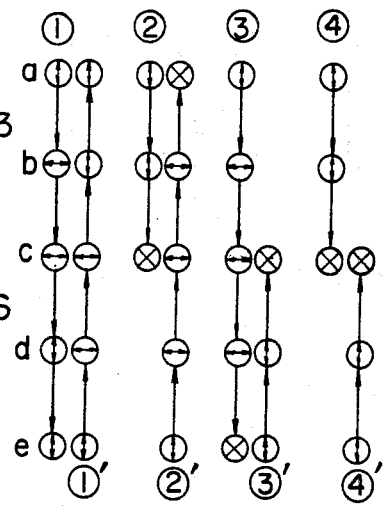
FIG. 4b shows polarization directions of light.

FIG. 4a is an exploded, explanatory view for showing an embodiment of a liquid crystal display device (including two liquid crystal layers) according to the first aspect of the present invention, and FIG. 4b shows polarization directions of light passing through the embodiment shown in FIG. 4a. In the device shown in FIG. 4a, an upper polarizer 21, a glass plate 22, an upper liquid crystal layer 23, a glass plate 24, an intermediate polarizer 25, a glass plate 26, a lower liquid crystal layer 27, a glass plate 28, and a lower polarizer 29 are arranged in the order described in the direction from top to bottom. Light passes through the device in the direction from top to bottom, and is then reflected back from a reflecting plate (not shown) to pass through the device in the direction from bottom to top. In FIG. 4a, reference numerals ①, ②, ③ and ④ designates paths of light in a case when light travels in the direction from top to bottom, and ①', ②', ③' and ④' paths of light in a case when the reflected light travels in the direction from bottom to top. On the paths ④ and ④', there are provided a pair of electrodes 30 for each of the liquid crystal layers 23 and 27. On the paths ③ and ③', there are provided a pair of electrodes 30, which are formed on facing surfaces of the glass plates 26 and 28 for sealing up the lower liquid crystal layer 27 therebetween. On the paths ② and ②', there are provided a pair of electrodes 30, which are formed on facing surfaces of the glass plates 22 and 24 for sealing up the upper liquid crystal layer 23 therebetween. On the paths ① and ①' is provided no electrode. In FIG. 4a, reference characters a, b, c, d and e designate points where light passes through the device. In more detail, light passes through the upper polarizer 21, the upper liquid crystal layer 23, the intermediate polarizer 25, the lower liquid crystal layer 27 and the lower polarizer 29 at the points a, b, c, d and e respectively. Further, reference symbols ↕ and ⟺ designates polarization directions of polarized light, and Ⓧ shows that light has been absorbed and therefore a pattern becomes black on a display surface.

In such a structure, when the electrodes for the upper liquid crystal layer 23 and the electrodes for the lower liquid crystal layer 27, which overlap each other on the paths ④ and ④', are simultaneously applied with a voltage, an overlapping portion of the electrodes forms a black pattern on the display surface as shown on the paths ④ and ④' in FIG. 4b, and thus the generation of a white on black region in a conventional device can be prevented. In more detail, the light travelling on the path ④ passes through the upper polarizer 21 and an upper liquid crystal part (made up of the upper liquid crystal layer 23, the glass plates 22 and 24, and so on) while keeping the polarization direction thereof (namely, of light) unchanged since the upper liquid crystal layer 23 is applied with the voltage. The light having passed through the upper liquid crystal part is absorbed by the intermediate polarizer 25 since the direction of transmission axis of the polarizer 25 is different from the polarization direction of light incident upon the polarizer 25, so that a region of the display surface corresponding to the region of the upper liquid crystal layer 23 applied with the voltage becomes black. Further, the light travelling on the path ④' passes through the lower polarizer 29 and a lower liquid crystal part (made up of the lower liquid crystal layer 27, the glass plates 26 and 28, and so on) without changing the polarization direction, and is then absorbed by the intermediate polarizer 25. Thus, the region of the lower liquid crystal layer 27 applied with the voltage forms a black pattern on the display surface. Accordingly, an overlapping portion of those regions of the upper and lower liquid crystal layers 23 and 27 which are simultaneously applied with the voltage, can also form a black pattern on the display surface. In a case where only one of the liquid crystal layers 23 and 27 is applied with the voltage, as shown by the paths ②, ②', ③ and ③' in FIG. 4a, a black pattern is formed on the display surface as shown by the paths ②, ②', ③ and ③' in FIG. 4b. In a case where neither of the liquid crystal layers 23 and 27 are applied with the voltage as shown by the paths ① and ①' in FIG. 4a, light can pass through all of the members 21 to 29, and therefore exhibits no pattern on the display surface.

Figure 5A:
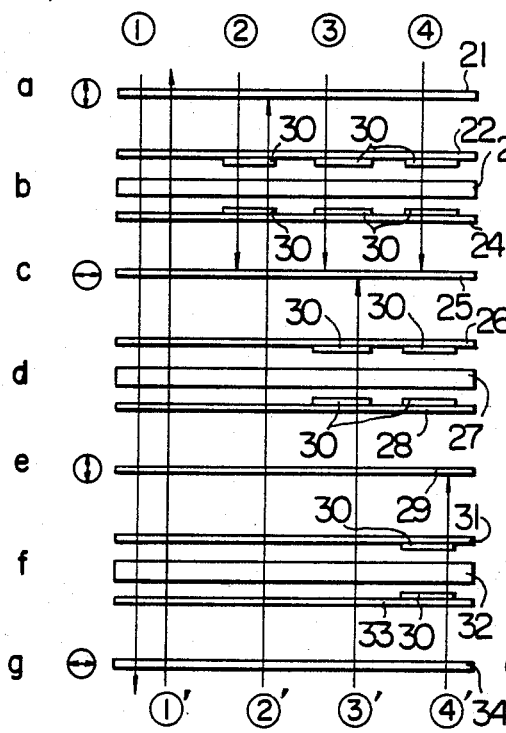
FIG. 5a is an exploded, explanatory views for showing that a light beam passes through various regions of an embodiment of a liquid crystal display device including three liquid crystal layers according to the first aspect of the present invention.
Figure 5B:
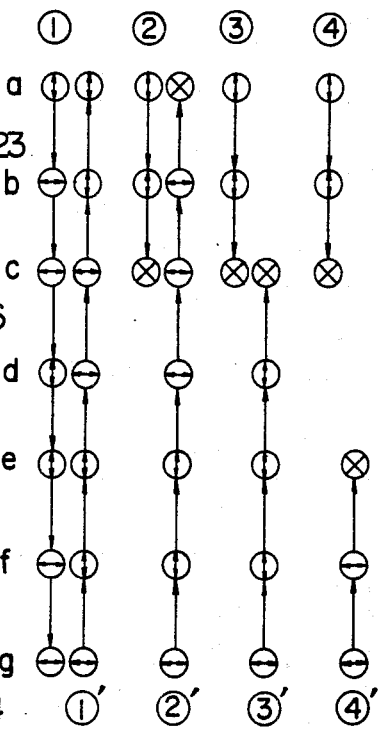
FIG. 5b shows polarization directions of light.

FIG. 5a is an exploded, explanatory view for showing another embodiment of a liquid crystal display device (including three liquid crystal layers) according to the present invention, and FIG. 5b shows the polarization direction of light passing through the embodiment shown in FIG. 5a. Like numerals designate like parts in FIGS. 4a, 4b, 5a and 5b. In FIG. 5a, reference numerals 31 and 33 designates glass plates, 32 a liquid crystal layer, and 34 a polarizer. Referring to FIGS. 5a and 5b, an overlapping portion of those regions of at least two layers of the liquid crystal layers 23, 27 and 32 which are simultaneously applied with a voltage, can form a black pattern on a display surface, as shown on the paths ③, ③', ④ and ④' in FIG. 5b. That is, the overlapping portion does not form a white on black pattern. It is to be noted that the polarizers 21 and 34 are different in direction of transmission axis from each other, the polarizers 21 and 25 are also different in direction of transmission axis from each other, and further the polarizers 29 and 34 are different in direction of transmission axis from each other.

In the above description, explanation has been made on the embodiments including two and three liquid crystal layers. However, the first embodiment of the present invention is not limited to such embodiments, but four or more liquid crystal layers can be included in a device according to the present invention. In this case, it is required that polarizers are provided above an uppermost liquid crystal layer, below a lowermost liquid crystal layers, and between adjacent liquid crystal layers, and adjacent polarizers are different in direction of transmission axis from each other.

Figure 6:
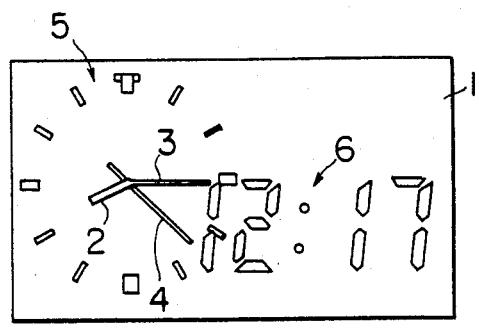
FIG. 6 is a plan view showing a display part of a watch according to the present invention.
Figure 7:
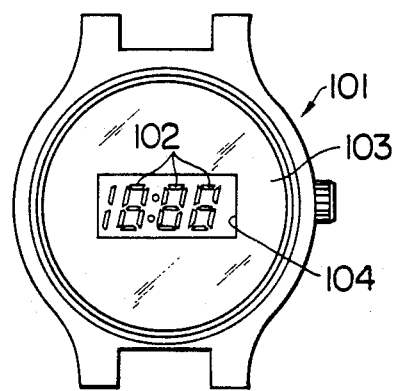
FIG. 7 is a plan view showing an example of wrist watches.

As explained previously, in a liquid crystal display device (including a plurality of liquid crystal layers) according to the first aspect of the present invention, an overlapping portion of patterns formed by the liquid crystal layers appears as a part of these patterns. Accordingly, a pattern formed by a liquid crystal layer and another pattern formed by another liquid crystal layer may overlap each other, as in a display part of a watch shown in FIG. 6. That is, the area of the display part can be reduced. In other words, an electronic device having such a display part can be made small-sized.

Figure 8:
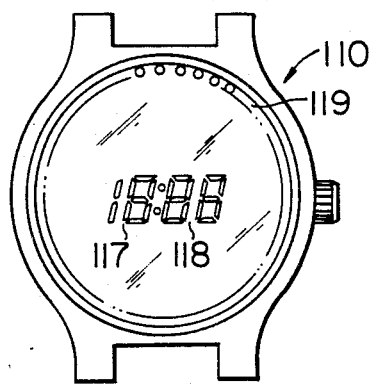
FIG. 8 is a plan view showing of a wrist watch according to one application of the present invention.
Figure 9:
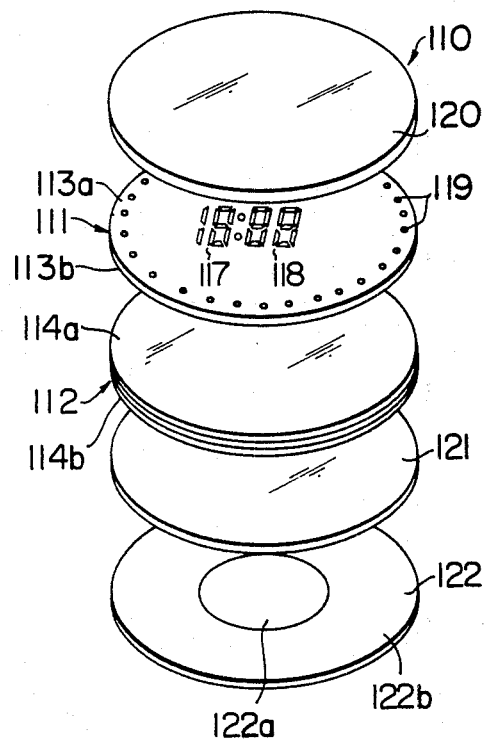
FIG. 9 is an exploded, perspective view of a main part of the wrist watch shown in FIG. 8.
Figure 10:
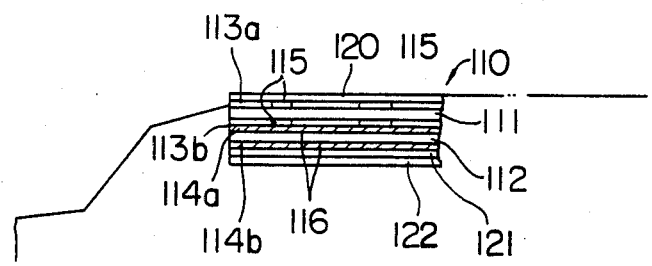
FIG. 10 is a sectional view of the main part shown in FIG. 9.

Further, since it is possible to overlap various patterns, a fashionable display pattern can be formed. Application:

FIG. 8 is a plan view showing a wrist watch according one application of the present invention, FIG. 9 is an exploded, perspective view for showing a main part of the wrist watch shown in FIG. 8, and FIG. 10 is a sectional view of the main part shown in FIG. 9. Referring to FIGS. 8, 9 and 10, a wrist watch 110 includes therein liquid crystal layers 111 and 112, which are piled up in the direction from top to bottom. The layer 111 is sandwiched and sealed up between a pair of glass plates 113a and 113b, and the layer 112 is sandwiched and sealed up between a pair of glass plates 114a and 114b. The glass plates 113a and 113b are provided with electrodes 115 at their portions corresponding to a pattern, and the glass plates 114a and 114b are provided with electrodes 116 in a similar manner. In more detail, hour-indicating numerals 117, minute-indicating numerals 118, and the like are formed in a central portion of the upper liquid crystal layer 111 using the well-known electrode segments (which form a part of the electrodes 115). Further, the electrodes 115 are so shaped as to form 60 second-indicating points 119 at regular intervals in a circumferential portion of the liquid crystal layer 111. In the lower liquid crystal layer 112, a pattern is formed by the electrodes 116, which covers the numerals 117 and 118 and the points 119. In the present case, the electrodes 116 are provided for the entire region of the liquid crystal layer 112.

A pair of polarizers 120 and 121 are provided above the upper liquid crystal layer 111 and below the lower liquid crystal layer 112 with their transmission axes being made parallel to each other, and a reflecting plate 122 is placed below the lower polarizer 121 with its reflecting surface being opposed to the polarizer 121. The reflecting surface of the reflecting plate 122 can be colored in a given tint. The color of the reflecting surface becomes the display color of the numerals 117 and 118 and the points 119. For example, a central portion 122a of the reflecting plate 122 assumes a green color, and a circumferential portion 112b assumes a red color.

Now, explanation will be made of the display mechanism of the watch 110 shown in FIGS. 8, 9 and 10.

Figure 1:
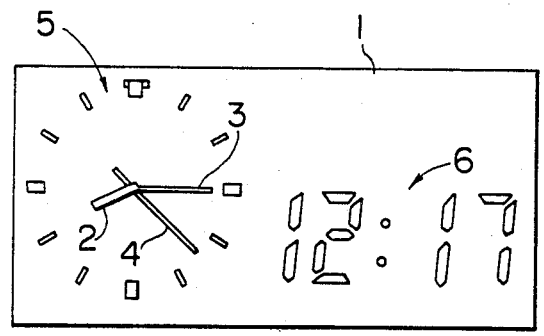
FIG. 1 is a plan view showing a display part of a conventional watch including two liquid crystal layers.
Figure 2:
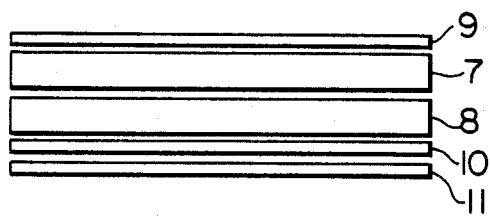
FIG. 2 is an exploded, explanatory view for showing an arrangement of liquid crystal layers and the like in the display part shown in FIG. 1.
Figure 3A:
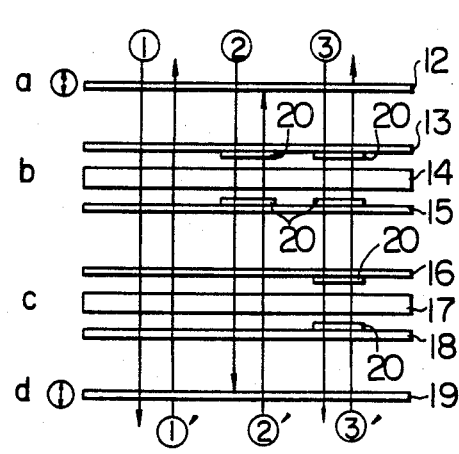
FIG. 3a is an exploded, explanatory view for showing that a light beam passes through various regions of the display part shown in FIGS. 1 and 2.
Figure 3B:
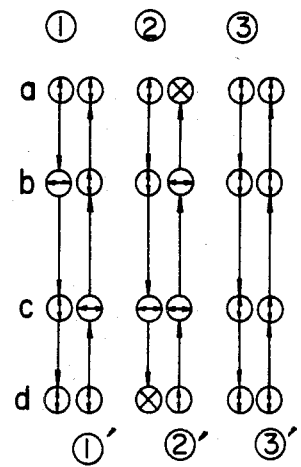
FIG. 3b shows polarization directions of light.

When respective pattern regions of the liquid crystal layers 111 and 112 are simultaneously applied with a voltage, an overlapping portion of the pattern regions form a white on black pattern, as has been explained previously in conjunction with FIG. 3. In the watch 110, the greater part of its surface becomes black when the voltage is applied between the electrodes 115 and between the electrodes 116 since the electrodes 116 are provided for the entire region of the lower liquid crystal layer 112, but the numerals 117 and 118 and the points 119 form white on black patterns on the surface since the pattern region of the upper liquid crystal layer 111 and that of the lower liquid crystal layer 112 overlap each other at the numerals 117 and 118 and at the points 119. In other words, the numerals 117 and 118 and the points 119 are formed by the light which is reflected back from the reflecting plate 112 and assumes the same color as the reflecting surface. Accordingly, the numerals 117 and 118 assume a green color, and the points 119 a red color.

That is, in the above watch, the hour and the minute are indicated by green figures (or numerals) on the black ground, and the second is indicated by a red point which is formed in such a manner that 60 pattern regions 119 in the circumferential portion of the upper liquid crystal layer 111 are successively applied with the voltage. Thus, a colorful and fashionable wrist watch can be formed.

Alternatively, the electrodes 116 are provided for only those regions of the lower liquid crystal layer 112 which correspond to the numerals and points 117, 118 and 119 and their neighborhood, and those surface portions of the glass plates 114a and 114b which are not provided with the electrodes 116, are coated with a black paint. In this case, power consumption is reduced since the area of the electrodes 116 is decreased. Further, when it is desired that the time indication is given by a white on black pattern, the reflecting plate 122 is left uncolored.

Figure 11:
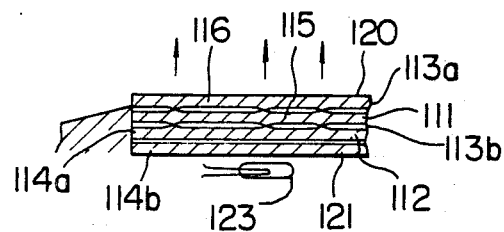
FIG. 11 is a sectional view for showing a modification of a wrist watch according to the application of the present invention.

FIG. 11 shows another modification of the watch shown in FIGS. 8, 9 and 10. In this embodiment which can consume a sufficient amount of power, a light source 123 for emitting a colored light is provided below the lower polarizer 121 in place of the reflecting plate 122 to form a display pattern which is higher in brightness than that obtained in the watch shown in FIGS. 8, 9 and 10.

Figure 12:
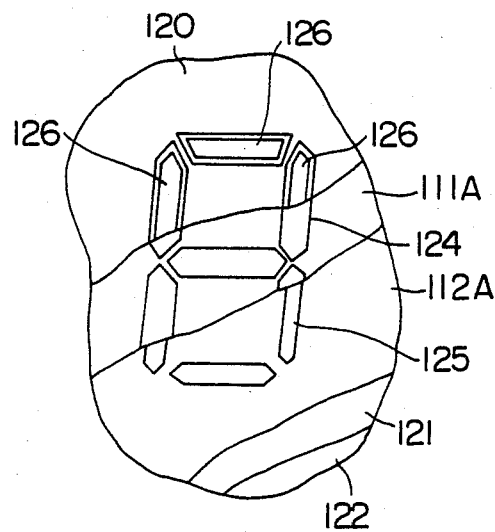
FIGS. 12 and 13 are plan views for showing other modifications of a liquid crystal display device according to the application of the present invention.

FIG. 12 shows a further modification of a display device of an electronic desk calculator according to the application of the present invention. In this modification, segments 124 for displaying numerals are formed in an upper liquid crystal layer 111A, and segments 125 are formed in a lower liquid crystal layer 112A. Each of the segments 124 is made slightly larger than the similar in shape to corresponding one of the segments 125. An overlapping portion of a segment 124 and a corresponding segment 125 forms a white on black pattern on a display surface, and therefore a numeral is displayed in the form of a white pattern fringed with black lines.

In a case where, in the above modification at least one of the liquid crystal layers 111A and 112A contains therein a dichroic dye for forming a color, as is disclosed in the previously-mentioned Japanese Patent Application (Laid-open No. 79663/79), the liquid crystal layer containing the dye is colored upon the application of a voltage thereto, and therefore a central portion of each of segments which make up a display figure (or numeral), is colored. That is, a colored pattern can be displayed. Further, when a reflecting plate is colored in an appropriate tint, a colorful display surface can be formed by the color of the display figure and the color of the reflecting plate. It is needless to say that a liquid crystal layer containing a dichroic dype may be used in the devices shown in FIGS. 8, 9, 10 and 11.

Figure 13:
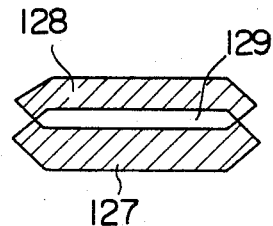

As described above, according to the application of the present invention, an overlapping portion of respective pattern regions formed in upper and lower liquid crystal layers is used as a display pattern. Accordingly, a display pattern can be formed in the following manner. Referring to FIG. 13, a pattern region (or segment) 128 formed in an upper liquid crystal layer is slightly deviated in position from a segment 129 formed in a lower liquid crystal layer. In this case, a display pattern is formed by an overlapping portion 129 (having a small width) of the segments 128 and 129. That is, a thin display pattern can be formed.

In conventional methods, it is very difficult to obtain a thin display pattern since an electrode having a very small width cannot be readily formed. According to the application of the present invention, it is very easy to obtain such a thin display pattern, which can produce an effect different from the color effect from the viewpoint of design. The above-mentioned thin display pattern may be used to form hands of a liquid crystal watch with a sweep hand.

As has been described above, according to the application of the present invention, respective pattern regions formed in a plurality of liquid crystal layers are arranged so as to form a desired display pattern by an overlapping portion of the pattern regions. Accordingly, the desired display pattern is obtained in the form of a white on black pattern, which produces an inverse design effect as compared with a conventional effect and moreover can be colored. That is, a colorful and fashionable display pattern can be provided. Further, a display device according to the application of the present invention is advantageous in that the structure thereof is simple, a smaller number of parts are employed so that the cost of the device is low, and a smaller number of fabrication steps are required to complete the device.

What is claimed is:

1. A liquid crystal display device comprising:
   (a) a plurality of liquid crystal layers each for displaying a pattern, said liquid crystal layers being piled up;
   (b) a pair of polarizers arranged above an uppermost liquid crystal layer and below a lowermost liquid crystal layer;
   (c) electrode patterns provided for said liquid crystal layers and having predetermined shapes respectively; and
   (d) at least one polarizer arranged between said liquid crystal layers in such a manner that a transmission axis of said polarizer is perpendicular to a transmission axis of each of two polarizers adjacent to said polarizer, so that said electrode patterns on different liquid crystal layers may be viewed in a darkened state at the same time without light areas being viewed where said electrode patterns overlap.

2. A liquid crystal display device according to claim 1, wherein each of said liquid crystal layers rotates the axis of polarization of incident light substantially by 90 degrees in the absence of an applied voltage and maintains the axis of polarization of incident light unchanged in the presence of an applied voltage.

3. A liquid crystal display device according to claim 2, wherein the number of liquid crystal layers is three.

4. A liquid crystal display device according to claim 3, wherein said at least one polarizer is disposed between each pair of adjacent liquid crystal layers.

5. A liquid crystal display device comprising:
   (a) at least two adjacent liquid crystal layers being piled up, each layer being capable of rotating a polarization axis of an incident light substantially by 90 degrees in the absence of a voltage to be applied thereto and of maintaining the polarization axis unchanged in the presence of the voltage to be applied thereto;
   (b) a pair of electrodes disposed for each of said liquid crystal layers for applying a voltage across a selected area of the liquid crystal layer sandwiched therebetween so as to control the rotation of a polarization axis of a light transmitting through said selected area, said selected areas of the adjacent liquid crystal layers having at least an overlapping region;
   (c) a pair of outside polarizers disposed to sandwich said adjacent liquid crystal layers therebetween; and
   (d) an intermediate polarizer interposed between said adjacent liquid crystal layers.

6. A liquid cyrstal display device according to claim 5, wherein said outside polarizers have the same polarization axis as each other, while said intermediate polarizers have a polarization axis different from said outside polarizers.

7. A liquid crystal display device comprising:
   (a) a plurality of liquid crystal layers being piled up, each layer being capable of rotating a polarization axis of an incident light substantially by 90 degrees in the absence of an applied voltage and of maintaining the polarization axis unchanged in the presence of an applied voltage;
   (b) a pair of electrodes for each of said liquid crystal layers and between which each liquid crystal layer is sandwiched for applying an electric field in a selected area of the liquid crystal layer so that the voltage application between said pair of electrodes controls the rotation of a polarization axis of light transmitting through said selected area, the selected areas for said plurality of liquid crystal layers having at least an overlapping region;
   (c) a pair of polarizers disposed to sandwich said plurality of liquid crystal layers therebetween; and
   (d) an intermediate polarizer disposed between the pairs of electrodes which define said overlapping area.

8. In a watch having a liquid crystal display device, said liquid crystal display device comprising:
   (a) at least two piled liquid crystal elements for displaying different display patterns, each element having a liquid crystal layer and an electrode pattern corresponding to said display pattern for applying a voltage across selected portions of said liquid crystal layer, said selected portions of the liquid crystal layer being capable of maintaining a polarization direction of light passing therethrough unchanged in the presence of the voltage applied to said electrode pattern, while being capable of changing the polarization direction of light transmitting therethrough in the absence of the voltage, said electrode patterns of the piled liquid crystal elements having at least an overlapping portion;
   (b) a pair of outside polarizers disposed to sandwich said piled liquid crystal elements therebetween, said outside polarizers having the same polarization direction as each other; and
   (c) an intermediate polarizer interposed between said piled liquid crystal elements, said intermediate polarizer having a polarization direction different from that of said outside polarizers.

* * * * *